US008115763B2

(12) United States Patent
Woop et al.

(10) Patent No.: US 8,115,763 B2
(45) Date of Patent: Feb. 14, 2012

(54) DEVICE FOR THE PHOTOREALISTIC REPRESENTATION OF DYNAMIC, COMPLEX, THREE-DIMENSIONAL SCENES BY MEANS OF RAY TRACING

(75) Inventors: Sven Woop, Heusweiler (DE); Philip Slussallek, Sulzbach (DE); Jörg Schmittler, Saarbrücken (DE)

(73) Assignee: Jordaan Consulting Ltd. V, LLC, Wilmington, DE (US)

( * ) Notice: Subject to any disclaimer, the term of this patent is extended or adjusted under 35 U.S.C. 154(b) by 340 days.

(21) Appl. No.: 10/589,794

(22) PCT Filed: Feb. 16, 2005

(86) PCT No.: PCT/DE2005/000266
§ 371 (c)(1),
(2), (4) Date: Aug. 17, 2006

(87) PCT Pub. No.: WO2005/078665
PCT Pub. Date: Aug. 25, 2008

(65) Prior Publication Data
US 2007/0182732 A1 Aug. 9, 2007

(30) Foreign Application Priority Data
Feb. 17, 2004 (DE) .......................... 10 2004 007 835

(51) Int. Cl.
*G06T 17/00* (2006.01)
(52) U.S. Cl. .......................... 345/420; 345/426; 345/619
(58) Field of Classification Search .................. 345/420, 345/440, 422
See application file for complete search history.

(56) References Cited

U.S. PATENT DOCUMENTS

| 5,305,430 A | | 4/1994 | Glassner |
| 5,442,733 A | * | 8/1995 | Kaufman et al. .............. 345/424 |
| 5,594,844 A | | 1/1997 | Sakai et al. |
| 5,933,146 A | * | 8/1999 | Wrigley ........................ 345/420 |

(Continued)

FOREIGN PATENT DOCUMENTS

DE      44 17 664      12/1994

(Continued)

OTHER PUBLICATIONS

Kurachi, "Graphics Hardware Performing A Ray Tracing With a Hardware," CG World, Japan, Works Corporation, Dec. 1, 2002, vol. 52, p. 116-119.

(Continued)

*Primary Examiner* — Xiao M. Wu
*Assistant Examiner* — Phi Hoang
(74) *Attorney, Agent, or Firm* — Schwabe, Williamson & Wyatt, P.C.

(57) ABSTRACT

The invention relates to a device for the photorealistic representation of dynamic, complex, three-dimensional scenes by means of ray-tracing. Said device comprises at least one programmable ray-tracing processor in which are implemented:
  special traversing instructions and/or
  vector arithmetic instructions and/or
  instructions for establishing ray-tracing acceleration structures and/or
  at least one decision unit (mailbox), which prevents objects or triangles that have already been intersected by a ray cast during ray tracing from being intersected again by the ray.

The inventive device is organized such as to allow a plurality of threads to be processed in parallel and to allow a plurality of threads to be automatically processed synchronously, the device being provided with an n-level cache hierarchy and/or virtual memory management and/or a direct link to the main memory.

23 Claims, 9 Drawing Sheets

U.S. PATENT DOCUMENTS

| | | | |
|---|---|---|---|
| 6,088,035 | A | 7/2000 | Sudarsky et al. |
| 6,111,582 | A | 8/2000 | Jenkins |
| 6,302,541 | B1 | 10/2001 | Grossmann |
| 6,556,200 | B1 | 4/2003 | Pfister et al. |
| 6,587,110 | B1 | 7/2003 | Kunimatsu et al. |
| 6,597,359 | B1 * | 7/2003 | Lathrop ................... 345/440 |
| 6,664,961 | B2 | 12/2003 | Ray et al. |
| 6,868,420 | B2 | 3/2005 | Perry et al. |
| 7,012,604 | B1 | 3/2006 | Christie et al. |
| 7,164,420 | B2 * | 1/2007 | Ard .......................... 345/423 |
| 7,483,024 | B2 * | 1/2009 | Maillot ..................... 345/420 |
| 7,495,664 | B2 * | 2/2009 | Keller et al. ............... 345/426 |
| 2002/0140703 | A1 | 10/2002 | Baker et al. |
| 2003/0001842 | A1 * | 1/2003 | Munshi ..................... 345/426 |
| 2003/0160788 | A1 * | 8/2003 | Buehler .................... 345/422 |
| 2003/0165254 | A1 | 9/2003 | Chen et al. |
| 2003/0227457 | A1 * | 12/2003 | Pharr et al. ............... 345/426 |
| 2004/0233222 | A1 * | 11/2004 | Lee et al. .................. 345/621 |
| 2005/0041024 | A1 * | 2/2005 | Green et al. .............. 345/426 |
| 2006/0066607 | A1 * | 3/2006 | Schmittler et al. ........ 345/419 |
| 2008/0043018 | A1 | 2/2008 | Keller et al. |

FOREIGN PATENT DOCUMENTS

| | | |
|---|---|---|
| DE | 43 31 715 | 3/1995 |
| DE | 197 37 449 | 2/1999 |
| DE | 197 53 040 | 5/1999 |
| DE | 198 27 590 | 12/1999 |
| JP | 2000-293709 A | 10/2000 |
| JP | 2001-092985 A | 4/2001 |

OTHER PUBLICATIONS

Hirata et al, "An Elementary Processor Architecture with Parallel Instruction Issuing from Multiple Threads," Transactions of Information Processing Society of Japan, Japan, Information Processing Society of Japan, Apr. 15, 1993, vol. 34, No. 4, pp. 595-605.

Onoue et al., "A Rendering Method on Desert Scenes of Dunes with Wind-Ripples," Transaction of IEICE, Japan IEICE, Feb. 1, 2003, vol. J86-D-II, No. 2, pp. 282-289.

Kanazawa et al., "A CG Model of Illuminated Volume By Spotlight," IEICE Technical Report, Japan, IEICE, Mar. 12, 1998, vol. 97, No. 597, pp. 7-13.

Fender et al., "A High-Speed Ray Tracing Engine Built on a Field-Programmable System," Deutsches Patent Und Markenamt, IEEE Xplore, pp. 188-195 (Dec. 15-17, 2003).

Goldsmith et al., "Automatic Creation of Object Hierarchies for Ray Tracing," IEEE CG&A, Deutsches Patent Und Markenamt, pp. 14-20, California Institute of Technology Synchrotron Laboratory 206-49, Pasadena, California, 1987.

Aruga et al., "A Space Sampling Method for Improving Realism of 3-Dimensional Computer Graphics," PFU Technical Review, PFU, Aug. 1, 1995, vol. 6, No. 2, pp. 83-92.

Final Office Action issued Feb. 23, 2011 from Japanese Application No. 2006-552460.

Schmittler J. et al: "A virtual memory architecture for real-time ray tracing hardware," Computers and Graphics, Pergamon Press Ltd., Oxford, GB, vol. 27, No. 5, Oct. 2003, pp. 693-699, XP004465051 ISSN: 0097-8493, p. 693-p. 695.

Schmittler J., Wald I, Slusallek P: "SaarCOR—A Hardware for Ray Tracing" Proceedings of Eurographics Graphics Hardware 2002, Sep. 1, 2002, pp. 27-36, XP002328209 Saarbrücken, Germany.

Wald I et al: "Distributed interactive ray tracing of dynamic scenes" Parallel and Large-Data Visualization and Graphics, 2003. PVG 2003. IEEE Symposium on Oct. 20-21, 2003, Piscataway, NJ, USA, IEEE, Oct. 20, 2003, pp. 77-85, XP010670788 ISBN: 0-7803-8122-X, p. 78-p. 80.

Rubin S. Witted T: "A 3-Dimensional Representation for Fast Rendering of Complex Scenes" Siggraph 1980 Conference Proceedings. Seventh Annual Conference on Computer Graphics and Interactive Techniques Jul. 14-18, 1080 Seattle WA, USA, vol. 14, No. 3, 1980, pp. 110-116, XP002328212, Computer Graphics USA ISSN: 0097-8930, p. 110-p. 112.

Foley J D et al: "Computer Graphics Principles and Practice: 16.12 Recursive Ray Tracing" Computer Graphics, Principles and Practice, Reading, Addison Wesley, US 1006, pp. 7760792, XP002328211 p. 786-p. 787.

Foley J D et al: "Computer Graphics Principles and Practice" Computer Graphics. Principles and Practice, Reading, Addison Wesley, US 1996, pp. 649-720, XP002082444 p. 701-p. 711.

Clark J H: "Hierarchical Geometric Models for Visible Surface Algorithms" Communications of the Association for Computing Machinery, Association for Computing Machinery. New York, US, vol. 19, No. 10, Oct. 1, 1976, pp. 547-554, XP00646877 ISSN: 0001-0782 p. 551.

Department of Computer Graphics at the University of Saarland, "A Simple and Practical Method for Interactive Ray-Tracing of Dynamic Scenes" (2002).

Office Action mailed Nov. 22, 2006 from U.S. Appl. No. 10/526,055.

Notice of Allowance mailed Jun. 29, 2007 from U.S. Appl. No. 10/526,055.

Appel, Arthur, "Some Techniques for shading machine rendering of solids," Proceedings of "AFIPS 1968 Spring Joint Computer Conference," Apr. 30-May 2, vol. 32, pp. 37-45, Atlantic City, New Jersey.

Glassner (Editor), "An Introduction to Ray Tracing," Academic Press, ISBN 0-12-286160-4 (Feb. 11, 1989).

Wald et al., "A Simple and Practical Method for Interactive Ray Tracing of Dynamic Scenes," Saarland University, Technical Report Apr. 2002, submitted for publication, http://graphics.cs.uni-sb.de/Publications/TR/2002/Dyn/DynamicRayTracing.pdf.

Wald et al., "Interactive Rendering with Coherent Ray Tracing," Computer Graphics Group, Saarland University, vol. 20 (2001), No. 3, The Eurographics Association and Blackwell Publishers 2001 (Guest Editors), Oxford, MA, USA.

Lext et al., "Towards Rapid Reconstruction for Animated Ray Tracing," Department of Computer Engineering, Chalmers University of Technology, Sweden, The Eurographics Association 2001, Short Presentations, pp. 311-318.

Reinhard et al., "Dynamic Acceleration Structures for Interactive Ray Tracing," University of Utah, Rendering Techniques 2000, Proceedings of the Eurographics Workshop, Brno, Czech Republic, Jun. 26-28, 2000, pp. 299-306, XP002269803.

Briere et al., "Hierarchical View-dependent Structures for Interactive Scene Manipulation," SIGGRAPH 96, New Orleans, Louisiana, Aug. 1996.

Hook, David G., "Algorithms For Accelerating Ray Tracing," May 29, 1995, http://72.14.209.104/search?q=cache:asx__13iRcaoJ:bund.com.au/~dgh/HookMAppScThesis.ps.gz+algorithm+for+accelerating+ray+tracing&hl=en&ct=clnk&cd=5&gl=us.

Wald et al., "State of the Art In Interactive Ray Tracing," Qluelle:www.openrt.de/Publications.

ISR mailed Mar. 2, 2004 from WO2004/021274 A2.

ISR mailed Jun. 21, 2005 from WO2005/078665 A1.

EP Office Action issued Mar. 17, 2010 from EP Application No. 03790730.0.

Japanese Decision to Grant issued May 24, 2011 from Japanese Application No. 2006-552460, mailed May 26, 2011.

Watt, A., "3D Computer Graphics," 2000, Addison-Wesley, Harlow, England XP002269804, Kapitel 12, pp. 358 and 365.

Office Action mailed Sep. 7, 2011 from U.S. Appl. No. 12/608,864.

Arnaldi et al: A new space subdivision method for ray tracing CSG modelled scenes; Aug. 1987; Springer Berlin: The Visual Computer, vol. 3, No. 2; pp. 98-108.

Macdonald et al.; Heuristics for ray tracing using space subdivision; Jun. 1990; Springer-Verlag New York; The Visual Computer, Volumbe 6, No. 3; pp. 153-166.

* cited by examiner

DEVICE FOR THE PHOTOREALISTIC REPRESENTATION OF DYNAMIC, COMPLEX, THREE-DIMENSIONAL SCENES BY MEANS OF RAY TRACING

CROSS REFERENCE TO RELATED APPLICATIONS

Applicants claim priority under 35 U.S.C. §119 of German Application No. 10 2004 007 835.1 filed Feb. 17, 2004. Applicants also claim priority under 35 U.S.C. §365 of PCT/DE2005/000266 filed Feb. 16, 2005. The international application under PCT article 21 (2) was not published in English.

The invention relates to a device with which dynamic, complex, three-dimensional scenes can be represented with high image repetition rates on a two-dimensional display through use of real-time ray-tracing hardware architecture. Dynamic scenes are scenes in which, aside from the camera position, the geometry of the objects to be represented can change from frame to frame. The invention is characterized above all by the fact that it supports a hierarchical object structure, that is, the main scene may consist of a plurality of objects each of which is built up from sub-objects; this nesting may be extended to an arbitrary depth. The objects on any one hierarchy level may be moved individually but also together. This makes it possible to create highly dynamic, complex scenes and, by using the same object at a multiple number of locations in the scene, to keep the representation of the scene in the memory small.

These nested object levels are realized according to the invention by extending the hardware implementation of the known ray-tracing pipeline by a transformation unit included in the hardware, said transformation unit transforming the rays into the objects. In order to make optimal use of the hardware resources, this unit is only included once; aside from object space transformation, it is used to compute the ray-triangle intersection points, to generate primary rays and to generate secondary rays.

Through use of special processors designed for ray tracing, the invention allows the user the full system programmability by using, according to the invention, a novel processor architecture consisting of the combination of a standard processor core with one or more special ray-tracing instructions. Use of these ray-tracing processors permits the programming of a wide variety of ray-tracing procedures. Primitive scene objects can be configured programmably, so that, in contrast to today's graphic cards, the use of spline surfaces is also possible; to this end, a special algorithm is programmed for computing the intersection of a ray with the spline surface. As is standard in today's rasterization hardware, a wide variety of surface shading models may be programmed.

To output the picture data on a display, the invention may be combined with state-of-the-art rasterization hardware by using shared frame buffers and z-buffers.

PRIOR ART

The prior art relating to the representation of three-dimensional scenes currently falls under two main categories, namely rasterization and ray-tracing (see Computer Graphics/Addison-Wesley ISBN 0201848406).

The well-known rasterization process, which is used primarily in computer graphic cards, is based on the principle of projecting every scene geometry onto a frame buffer and z-buffer. To this end, the color and brightness values of the pixels are stored in the frame buffer and the geometric depth values in the z-buffer, but only if the previous geometric value in the z-buffer is greater (further away from the viewer) than the new one. In this way, it is ensured that closer objects overwrite more distant ones, and that at the end of the process, only the actually visible objects are imaged in the frame buffer.

However, this method has the serious disadvantage that complex scenes involving millions of objects cannot be represented in real time with the hitherto known hardware, because, as a rule, it is necessary to project all the triangles (objects) of the scene. Furthermore, the process requires a frame buffer and a z-buffer, on which many billions of write operations must be performed per second; for image formatting, most of the pixels are overwritten several times per frame. As a result of pixels further from the viewer being overwritten by pixels of closer objects, already computed data are discarded, thus preventing optimal system performance.

Shadows can be computed with today's rasterization hardware by employing complex techniques, but accuracy problems are encountered with complex scenes. Neither specular reflections at curved surfaces nor the computation of light refractions can be realized physically correctly with this technique.

System performance is enhanced by a second method, the ray-tracing process, which is well known for its photorealistic images but also for its computational complexity. The basic idea behind ray tracing is closely related to physical light distribution models (see Computer Graphics/Addison-Wesley ISBN 0201848406).

In a real environment, light is emitted from light sources and is distributed in the scene according to physical laws. The picture of the environment can be captured by a camera.

Ray tracing works the opposite way round, and traces the light from the camera, which represents the viewer's position, back to its source. This entails shooting a virtual ray for each pixel of the image in the direction illuminating the pixel. This shooting of the ray is called ray casting. If the ray strikes an object, the color of the pixel is computed from, among other things, the color of the object encountered, the normals to the surface and the light sources visible from the point of impact. The visible light sources are determined by tracing secondary rays shot from each light source to the point of impact. If these shadow rays encounter an object between the light source and the point of impact, the point is in the shadow with respect to the light source.

Aside from the described shadow computation, this method also allows computation of specular reflections and of light refractions by means of computing reflection rays and refracted secondary rays. An added advantage is that scenes of almost arbitrary size can be handled and represented. The reason for this is that an acceleration structure is used. This is a special process with an appropriate data structure that makes it possible to "shoot" and traverse the virtual ray rapidly through the scene. A number of objects that are potential hit candidates are selected on the way, as a result of which the point of impact is quickly found. Theoretical studies have shown that on average, the complexity of the ray tracing process grows logarithmically with the size of the scene. That means that squaring the number of scene objects only doubles the computational overhead.

Typical acceleration structures are, for example, the uniform grid, the kD tree, the octree and the bounding-volume hierarchy (see Computer Graphics/Addison-Wesley ISBN 0201848406). All these techniques are based on the idea of subdividing the space into many cells and storing the geometry of each of these cells. The traversal process then traces the ray from cell to cell and always intersects it with precisely those objects that are located in the cell. The four techniques differ only in the method of subdivision. With the uniform grid, the space is subdivided into cube-shaped cells of equal size. The drawing of FIG. 7 illustrates this technique. The three other techniques are based on recursive space subdivision. In the kD-tree technique, the starting space is subdivided recursively and axis-parallel at an arbitrary point. The drawing of FIG. 8 illustrates this technique. This subdivision of the space is stored in a recursive data structure (a binary tree). The third technique, called octree, is likewise recursive, the only difference being that the relevant cells are always subdivided into 8 equal-sized rectangular cells. This is illustrated in FIG. 9. The bounding-volume hierarchy subdivides the space into n arbitrary volumes, which, unlike in the other techniques, are even allowed to overlap.

In contrast to the rasterization process, there is currently no pure hardware solution that implements the ray-tracing process, but only software-based systems that need a relatively large amount of computational power and computing time. To illustrate the extent of time required for the computations it may be remarked that with PC hardware conforming to the current prior art, a computation time of several seconds to several hours—the exact time will depend on the complexity of the image—is needed to create a single still image using this method. The computation of moving images requires a correspondingly large amount of time and/or the availability of special mainframes.

The Department of Computer Graphics at the University of Saarland has developed a software-based real-time ray-tracing system that is used on a cluster of over 20 computers.

The U.S. Pat. No. 6,597,359 B1 describes a hardware solution for ray tracing, but it is limited to static scenes.

The U.S. Pat. No. 5,933,146 likewise describes a hardware solution for ray tracing, which is likewise limited to static scenes.

The paper "SaarCOR—A Hardware Architecture for Ray-Tracing" by the Department of Computer Graphics at the University of Saarland describes a hardware architecture for ray tracing, but it is again limited to static scenes.

The paper "A Simple and Practical Method for Interactive Ray-Tracing of Dynamic Scenes" by the Department of Computer Graphics at the University of Saarland describes a software approach to supporting dynamic scenes in a ray tracer. However, the software process described uses only one object level, i.e. it cannot handle multi-level nesting.

The described prior art currently offers neither software nor hardware solutions with which complex dynamic scenes can be represented in real time. The performance limitation of the known rasterization processes lies in the number of objects to be represented.

Ray-tracing systems are admittedly able to represent numerous triangles, but, on account of the preliminary computations that are necessary, have the limitation that the position can only be changed to a restricted extent. Scenes comprising some billions of triangles require very high computational power and a very large memory, and can only be processed on fast and complex mainframes or by means of cluster solutions.

This is why software-based, dynamic, real-time ray-tracing systems cannot be realized with available staff-computer hardware. It is likely that for reasons of cost, the described cluster solution will remain restricted to special applications.

By contrast, the object of this invention is to propose a device with which ray tracing in dynamic, complex, three-dimensional scenes can be performed faster—preferably also in real time—in such manner that a photorealistic representation is obtained.

This object is established by a device according to claim 1, said device having at least one programmable ray-tracing processor in which are implemented:
  special traversing instructions and/or
  vector arithmetic instructions and/or
  instructions for establishing ray-tracing acceleration structures and/or
  at least one decision unit (mailbox), which prevents objects or triangles that have already been intersected by a ray cast during ray tracing from being intersected again by the ray.

The inventive device is organized in such manner as to allow a plurality of threads to be processed in parallel and a plurality of threads to automatically be processed synchronously. In addition, the device is provided with an n-level cache hierarchy and/or virtual memory management and/or a direct link to the main memory.

This device may preferably be realized in FPGA and/or in ASIC technology and/or another logic-based semiconductor technology or in discrete integrated logic, or in a combination of these technologies.

For a more detailed discussion of the decision unit, reference is made to FIG. 2, from which it is evident that the list unit has been extended by a mailbox. When a ray is cast, this mailbox notes which objects or triangles the ray intersects and prevents any one triangle or object from being intersected more than once by the ray. As a result, fewer ray-object, i.e. ray-triangle, intersection computations need to be carried out, and this accelerates the computation. The mailbox may be seen as a kind of intersection-computation cache, which, unlike a memory cache, does not prevent memory requests to the memory but prevents intersection computations instead. Standard caching processes such as 4-way caches may be used to implement the mailbox.

Claim 2 relates to a device for the photorealistic representation of dynamic, complex, three-dimensional scenes by means of ray tracing, wherein said device has at least one special traversal unit, at least one list unit, at least one decision unit (mailbox) which prevents objects or triangles that have already been intersected by a ray cast during ray tracing from being intersected again by the ray, at least one intersection-computation unit, at least one unit for establishing acceleration structures, at least one transformation unit and/or at least one unit for solving linear equation systems, and wherein a plurality of rays or threads may be processed in parallel and a plurality of rays or threads may automatically be processed synchronously and an arbitrary number of dynamic-object levels may be realized in dynamic objects, and wherein the device is provided with an n-level cache hierarchy and/or virtual memory management and/or a direct link to the main memory.

The embodiment according to claim 3 differs from the embodiment according to claim 2 in that, in claim 3, a ray tracing processor already described in claim 1 has supplemented the at least one transformation unit and/or the at least one unit for solving linear equation systems and/or the at least one intersection-computation unit in claim 2.

This ray-tracing-based device for the photorealistic representation of three-dimensional moving scenes, in which device the acceleration structures and processes defined in the software have been implemented in the corresponding hardware structures, is primarily intended for real-time use.

For the realization of arbitrary, disordered dynamics in a scene, the acceleration structure has to be computed anew for each image of the image sequence. This means that large scenes involve a huge computational overhead, since the entire geometry of the scene has to be "handled". In such cases, the advantage of the logarithmic complexity is swallowed up by the size of the scene.

A solution—described in the paper "A Simple and Practical Method for Interactive Ray-Tracing"—to this problem is to subdivide the scene into objects and to allow the movement of these objects exclusively in their entirety. This necessitates two acceleration structures.

A top-level acceleration structure above the objects of the scene, and a bottom-level acceleration structure for each of the objects. The objects are positioned in the scene in the form of object instances.

The difference between an object and its instance is that an object instance consists of an object and a transformation. The transformation is an affine function that shifts the object to an arbitrary location in the scene. Affine transformations additionally permit scaling, rotating and shearing of objects. In the following, for the sake of simplicity, the term object will also be used for object instances unless there is a chance of confusion.

A ray is first traversed through the top-level acceleration structure (ray tracing through the scene) until a potential hit object (the object encountered by the ray) is found. The ray is now transformed into the object's local coordinate system and goes on to traverse in the bottom-level acceleration structure of the object until an intersection point with a primitive object is found. Primitive objects are objects possessing no sub-structures. In ray tracers, these are generally triangles and spheres.

This method works very well in practice, but only as long as the number of objects does not become too large, as the top-level acceleration structure has to be rebuilt in every image. Rebuilding this acceleration structure is necessary if the objects within are moved.

The invention presents a solution that recursively supports the above subdivision of the scene into objects. In other words, it is not restricted to objects that are primitive objects but also permits these objects to be made up of sub-objects which themselves may also consist of sub-objects, etc. FIG. 1 illustrates how a tree can be built up from several object levels. To start with, a leaf is modeled as a level 1 object. This leaf is now instantiated repeatedly and applied to a branch, thus creating another object, this time a level 2 object. These small branches can now be instantiated repeatedly again to form a larger branch, or tree, as level 3 object. It may be remarked that here, several object levels occur in objects, and that the representation of the scene is small on account of the same geometries being used a plurality of times.

The ray-casting process used according to claim 2 of the invention is as follows:

The ray is traversed through the top-level acceleration structure until a potential hit object is found. If the object is a primitive object, the ray-object intersection is computed. If the object is not a primitive object, the ray is transformed into the object's local coordinate system and there continues the traversal recursively.

An essential part of the process is the transformation of the ray into the object's local coordinate system, as a result of which, in principle, the positioning of the object is cancelled by the affine transformation. In other words, the transformed ray now sees the object as no longer transformed. This transformation step requires a very complex affine transformation of the ray's origin and direction; however, the complicated hardware unit needed for this purpose can also be used for other tasks. It transpires that the transformation unit can also be used to compute intersections with many kinds of primitive objects, to compute primary rays and to compute many kinds of secondary rays. For the computation of primary rays, a similar camera transformation matrix is used as in the known rasterization processes. To start with, pre-primary rays of the type R=((0,0,0),(x,y,1)), that is, rays with the origin (0,0,0) and the direction (x,y,1), are defined, where x and y represent the coordinates of the pixel for which a primary ray is to be computed. For every camera position and alignment there is an affine transformation which transforms the ray R in such manner that it corresponds exactly to the incident direction of the camera pixel (x,y).

In order to compute the intersection with a primitive object, the ray is transformed into a space in which the primitive object is normalized. In the case of a triangle as primitive object, the ray is transformed, for example, into a space in such manner that the triangle has the form $\Delta_{norm}=((1,0,0),(0,0,0),(0,1,0))$. This is illustrated in FIG. 10. This transformation can occur by means of an affine transformation. In contrast to the general case, the subsequent computation of the intersection with the normalized triangle is very easy to solve in hardware. If the transformation is selected such that the triangle normal is transformed onto the (0,0,1) vector in the triangle space, the scalar product of ray and triangle normal can be computed very easily in the triangle space, since the scalar product of the ray direction (xt,yt,zt) and the triangle normal (0,0,1) is precisely 0*xt+0*yt+1*zt=zt.

The transformation may also be selected such that only 9 floating-point numbers are needed to represent it; this is effected by imaging the triangle normal onto a suitable normal in the normalized triangle space. However, this rules out the opportunity of computing the scalar product in the normalized triangle space.

It is clearly evident that this normalized object transformation may also be used for other kinds of objects, for example spheres, planes, cuboids, cylinders and many other geometric shapes; it is merely necessary to create a different intersection-computation unit in each case.

A major advantage here is the fact that every kind of primitive object is represented identically in the memory, namely as an affine transformation which transforms into the normalized object space. This makes it easier to configure the memory interface of a hardware solution. The transformation into the normalized object space is referred to as normalized space transformation.

Shadow rays and specular reflections may be computed efficiently with the transformation unit by computing suitable transformations and suitable rays.

The transformation unit can also be used to transform normals (vectors which are perpendicular to a surface). This transformation of normals is important because some shading models require the geometry normal at the point of impact. However, this normal must be available in the world coordinate system, which is not necessarily the case in the above process. Much rather, the normal is initially only available in the local coordinate system of the object encountered. It has to be transformed from there back into the world coordinate system.

The transformation unit, however, also has a drawback. Since the affine transformations, which may be stored as matrices, have to be pre-computed both for triangles and for the objects of the scene, it is not so easy to change the position of the triangle vertices efficiently from frame to frame. In vertex shaders on modern graphic cards, however, this is possible. Vertex shaders are specialized programmable units that are optimized for computing movements from points in space.

To make this possible, it is necessary to do without the preliminary data computation. Accordingly, computing an intersection with a triangle then necessitates solving a linear equation system with three unknowns. True, this explicit method of solution requires more floating-point operations, but it is necessary in conjunction with vertex shaders. Accordingly, it may make sense to replace the above-described transformation unit with a unit that solves a linear equation system. This unit may be used, among other things, to intersect with triangles or to transform rays into the local coordinate system of an object.

The ray casting method used according to claim 1 of the invention is of a similar nature to the method described in claim 2, except that the transformation and the intersection computation are implemented by suitable instructions for the ray-tracing processor. Particularly attractive here is the possibility of using alternative methods to compute ray-object intersections. For example, testing for ray-triangle intersections with Plucker coordinates permits efficient use of vertex shaders.

A problem connected with very detailed scenes is undesired aliasing effects. These are encountered particularly when the object density is very high in one direction. It may then happen that a ray strikes a black triangle, for example, and, if the camera is moved minimally, a white triangle is suddenly struck. Effects of this kind cause temporal and local aliasing noise in the image. The reason for this is that ray tracing generally uses infinitely narrow rays and does not take into account the fact that the light influencing a pixel spreads out like a pyramid, and that the ray widens with increasing distance. In actual fact, all the objects within this ray pyramid should be included for the pixel-color computation, but this is not possible in a real-time system. A new, simplified form of cone tracing is helpful here. Instead of considering an arbitrarily narrow ray, the ray's acceptance angle is evaluated additionally. This makes it possible to compute the width of the ray in question, which will depend on the distance from the camera. If, during traversal, a cell is encountered that is largely overlapped by the ray, it may not be useful to continue traversal. At this location, it may be beneficial to use simplified geometry of the interior of the volume for computation purposes. The fact that perhaps a million triangles are contained within the volume can then be ignored. It is possible that these triangles merely form a mountain face, which, on account of the size of the ray, can also be approximated by a colored plane.

However, if the triangles form a perforated entity such as the Eiffel Tower, it is better to select the color of the constructive grid elements and a transparency value as approximation.

It is to advantage that simplified geometry representations like these can be supported in the acceleration structure. FIG. 6 illustrates the idea using an octree as example. The simplified geometry of the boldly outlined volume, to which a node in the acceleration structure belongs, is shown. The ray overlaps almost the entire volume of the node, which means the simplified geometry can be used to compute the intersection.

An alternative method consists in storing the scene objects of the scene with different detail levels. This means that the objects are modeled using different resolutions or numbers of triangles, and that, additionally, detailed or simplified objects are used depending on the distance of the objects from the camera.

The fact that it is complicated to configure the above-described, permanently-wired, hardware-based ray-tracing pipeline programmably could be seen as a disadvantage thereof. Compared to a software-based ray-tracing approach, the hardware-based pipeline appears very rigid and specialized.

A CPU developed especially to suit the ray-tracing process is helpful here. This special ray-tracing processor consists of a standard CPU, for example a RISC processor, whose instruction set has been expanded by special instructions. Of particular importance is a traversing instruction which traverses the ray through an acceleration structure. Some stages of the process, furthermore, require complicated arithmetic operations that are carried out largely in three-dimensional space. It therefore makes sense to equip the CPU with a vector arithmetic unit, similar to today's familiar SSE2 instruction sets.

The CPU can be further optimized by exploiting the process's potential for parallel operations. For example, a plurality of threads (program runs) can be executed at once very effectively on a CPU, thus significantly enhancing CPU utilization and effectiveness. This applies particularly to waiting times for memory requests: if one thread makes a memory request, another thread can be executed during the request. FIG. 5 shows a typical design for a CPU of this kind.

Since dynamic scenes require that acceleration structures be recomputed for every frame, the CPU's instruction set has to be expanded by special instructions for establishing acceleration structures. During the establishment of acceleration structures it is often necessary to decide whether or not an object is located in a given cell into which it should be sorted. A special unit that optimizes the establishment of acceleration structures can accelerate the necessary computation by making a very easily computed preliminary decision. As cells, boxes are often used whose 6 bounding surfaces are perpendicular to the x, y and z axes. A box of this kind can be characterized by its vertices, the definition of just two vertices in fact being sufficient. It is often possible to determine/decide whether the triangle is located in this box by simply comparing the coordinates of the vertices. If, for example, the triangle is located far to the left of the box in the x direction, the x coordinates of the triangle's 3 vertices will all be smaller than the smallest x coordinate of the box's vertices (see FIG. 13). Many other arrangements can be decided in the same way, for example, whether the triangle is located entirely within the box. If no decision is possible, complicated mathematical formulae such as the SAP (Separating Axis Theorem) have to be used. The decision as to whether a box overlaps with another box can likewise be made by means of vertex comparisons.

For purposes of further optimization, a decision unit is used that prevents objects or triangles that have already been intersected by a ray cast during ray tracing from being intersected by the ray again. This is effected by expanding the list unit by a mailbox, as shown in FIG. 2. When a ray is cast, this mailbox notes which objects or triangles the ray intersects and prevents any one triangle or object from being intersected more than once by the ray. As a result, fewer ray-object, i.e. ray-triangle, intersection computations need to be carried out, and this accelerates the computation. The mailbox may be seen as a kind of intersection-computation cache, which, unlike a memory cache, does not prevent memory requests to the memory but prevents intersection computations instead. Standard caching processes such as 4-way caches may be used to implement the mailbox.

The units making up the ray tracing architecture require a very high memory bandwidth, in other words, very high data volumes have to be transmitted per unit of time. Normally, this can only be realized by connecting up very large numbers of memory chips in parallel. However, the necessary memory bandwidth can also be obtained by means of a suitable arrangement of multiple cache levels (n-level caches). Of the utmost importance here is a property of ray tracing known as coherence. Coherence denotes the fact that rays passing through similar areas of the 3D space access almost the same data in the acceleration structure and, accordingly, also the same objects. If this property is exploited, high cache hit rates can be obtained. That means it is highly probable that the required data will be found again in the cache, thus obviating the time-consuming necessity of downloading them from the main memory. As shown in FIG. 4, the caches themselves are arranged, for example, in a binary tree so as to serve a plurality of ray-tracing units.

Used in conjunction with a 3D display, the inventive device can naturally also be used for the photorealistic, three-dimensional, real-time representation of complex moving scenes. Depending on the display technology used, there are three image-output variants.

First, a configuration in which two images containing the stereo imprint are represented alternately, horizontally staggered, on a display in a time-division multiplex mode.

Second, a configuration in which two horizontally staggered images representing the stereo imprint are represented on a display in alternating vertical strips containing the picture information for the two images.

Third, a configuration in which the two horizontally staggered images are represented simultaneously on two separate displays or in a time-division multiplex mode.

The two horizontally staggered images, one to be assigned to the right eye and one to the left eye, are each rendered visible to one eye only by means of suitably spatial display arrangements or through use of image separation means (e.g. shutter spectacles, strip-like Fresnel prisms/lenses and polarization filters). The 3D displays to be used, and their video signal control requirements, are in keeping with the prior art and are not described in detail. Further information on the prior art relating to 3D displays may be taken from the following publications, which are cited as examples: Computer Graphics/Addison-Wesley ISBN 0201848406, DE 4331715, DE 4417664, DE 19753040, DE 19827590, DE 19737449

The uses of computer-animated, photorealistic, real-time, three-dimensional moving scenes and images range from the representation of three-dimensional CAD data and of medical and technical-analytical data, through film animation and use in flight simulators and driving simulators, to so-called "home" applications in computer games with complex real-time graphics.

The same processes may be additionally used—without further modifications to the functional configuration—for non-photorealistic image generation (e.g. line drawings or the representation of comic stills). It is likewise possible, again without the need for any technical modifications, to perform computations that are not generally associated directly with image computation. Examples here include collision detection for geometric objects and the discrete solving of numerical problems. None of the applications described are restricted to the interactive sector and all can also be used offline—for example for cinema-film computations or very complex physical simulations—without any modifications to the process or the device.

The functional realization and the hardware implementation of ray tracing is effected in complex and fast logic technologies, the implementation of which being effected both as permanently-wired digital logic in the form of discrete digital logic comprising individual standard ICs, or customer- and application-specific ICs such as ASICs, or in the form of complex, programmable logic devices/logic circuits, for example CPLD and FPGA technologies with or without a CPU core, or a combination of these technologies.

The exemplary embodiment, described below, of the invention describes the ray-tracing unit of a computer graphic card in which the hardware implementation of the ray-tracing process may be effected, by way of example, in a freely programmable FPGA logic device, in ASIC technology, or in a permanently wired custom chip.

In so far as processes and operational sequences are described, these are to be realized purely in hardware. This means that appropriate logic units and hardware-implemented arithmetic units must be configured.

The standard control electronics for controlling the data display (cathode ray tube, TFT, LCD or plasma monitor), and the timing thereof, are in keeping with the prior art, are assumed to be known and are not subject matter of the description. An interface between the image memory of this standard equipment and the implementation, as according to the invention, of the ray-tracing process is described.

The description comprises two parts: First, the ray-casting pipeline (in short, RCP) is described. This is the central entity of the design; it traverses the rays through the scene and sends back intersection data.

In the second part, an optimized ray-tracing architecture for the ray-casting pipeline is described; a plurality of these ray-casting pipelines operate together within this architecture.

FIG. 2 illustrates the ray-casting pipeline (RCP), which consists of several subunits. The traversal unit traverses the ray through a suitable acceleration structure, preferably a kD tree. The ray is traversed until it reaches an area of the scene in which potential hit objects are located. The objects in this area are stored in a list which is processed by the list unit. The list unit contains a mailbox, which, when a ray is cast, notes which objects or triangles the ray intersects and prevents any one triangle or object from being intersected more than once by the ray. As a result, fewer ray-object, i.e. ray-triangle, intersection computations need to be carried out, and this accelerates the computation.

These objects must now be tested for a possible intersection. If there is no valid intersection, traversing must be continued. The list unit sends the potential hit objects that have not yet been processed to the matrix-loading unit one after the other. The matrix-loading unit loads the affine transformation belonging to the object. This affine transformation can be represented by a 4×3 matrix. The matrices may be object-space transformation matrices or matrices that transform into the normalized space of a primitive object. After the matrix-loading unit has stored the matrix in the transformation unit, the ray-casting unit sends the rays through the transformation unit.

Following the transformation, two scenarios are now possible: First, the object involved may be an object that contains sub-objects. If this is the case, the rays return to the traversal unit and the transformed ray continues to be traversed in the object. If, however, the object is a primitive object, the ray goes on directly into the intersection-computation unit, which intersects the ray with the normalized object. As described earlier, the intersection-computation unit is able to support a plurality of normalized objects (triangles, spheres, etc.)

The computed intersection data are collected in the intersection unit. The intersection unit provides a reverse channel to the traversal unit, so that this can recognize whether already-valid intersection data are available.

The traversal unit, list unit and matrix-loading unit are the only components of the ray-casting pipeline which access external memories. The traversal unit accesses the acceleration structure, the list unit accesses lists of object addresses and the matrix-loading unit accesses affine transformations in the form of matrices. In order to ensure the necessary memory bandwidth, all three units are connected to the main memory via a dedicated cache.

A simplified version of the ray-casting pipeline, showing just the most important components, is illustrated in FIG. 12: the traversal unit, which traverses the rays through the acceleration structure, the list unit, which processes the lists, the transformation unit, which applies the loaded transformation to the rays, and the intersection-computation unit, which intersects the transformed ray with the normalized object.

The ray-casting pipeline is embedded in a suitable ray-tracing architecture, as shown in FIG. 3. The drawing shows 4 ray-casting-pipeline units, each with 3 caches. Two of these units, in each case, are connected with a shading unit. These shading units use the ray-casting-pipeline units to compute the colors of the image pixels. To this end, the shading unit shoots primary rays, processes the hit information sent back by the ray-casting pipeline, and shoots secondary rays, for example to light sources. The shading units may be in the form of permanently wired hardware or the programmable ray-tracing processors described later.

The shading units possess a channel to the transformation unit of the ray-casting pipeline. This is used to load camera matrices and matrices for secondary rays and thus to minimize the computational overhead for the shading unit. It is beneficial if the shading units each have a separate texture cache and shading cache. The shading cache contains shading information on the scene geometry, for example colors and material data. The texture cache is connected with the texture memory and enables the shading units to access textures. It is to advantage if each shading unit has its own local frame buffer in which it stores the colors and brightness values of the pixels currently being processed/computed. It is additionally beneficial if a z buffer is provided, as this is needed for the subsequently described connection to the standard rasterization hardware.

Once the color of a pixel has been fully computed by the shading unit, this color can be written into the global frame buffer via the optional tone-mapping unit. The tone-mapping unit applies a simple function to the color in order to image it in the 24-bit RGB space. The geometric depth values (z values), too, which are stored in the optional, local z buffer, can now be transferred into the optional global z buffer.

However, the color and the new z value are only written into the frame buffer or z buffer if the z value that was in the z buffer before is greater. This measure ensures that pixels are only written if they lie geometrically ahead of values already computed by the rasterization hardware or other ray-tracing passes. Through this arrangement, it is possible to combine the ray-tracing hardware with standard rasterization hardware operating on the same frame buffer/z buffer, which also constitutes the interface to this standard hardware.

To further increase the system power, additional optional shading units may be connected up in parallel with the associated ray-casting pipelines and caches. The power-boosting effect lies in the broadening of the data structure and the processing structure.

It is unlikely that the entire scene will fit into the local main memory of a ray-tracing chip. To solve this problem, the local main memory may be used as a large cache that caches sizable blocks of the scene. The actual scene is located elsewhere and is downloaded via DMA when needed. This virtual memory management process makes it possible to visualize large scenes that do not fit into the ray-tracing chip's main memory.

Photon mapping is a standard technique in which virtual photons are shot from the light sources into the scene and are collected on the surfaces of the scene. The light distribution of the scene can thus be simulated. This applies above all to caustics. If photons are shot, an acceleration structure—a kD tree, for example—is built up over the photons. Now, an image of this computed photon light distribution can be effected by visualizing the scene with standard ray-tracing techniques and incorporating the incident light intensity at every point of impact into the color computation in such manner that the energies of all the photons striking in the vicinity of this point are added up. This entails searching for all the neighboring photons in the photon acceleration structure. The traversal unit can help with this task by traversing a volume instead of traversing along a ray. All the neighboring photons can be processed in this way, for example by adding up their energies.

As a rule, ray-tracing processes operate with infinitely narrow rays, and this leads to sampling artifacts (aliasing). A much better approximation is obtained by using ray cones instead of rays. The light that illuminates a camera pixel does not come from a discrete direction but from a kind of pyramid, which can be approximated very well by a cone. Traversal of this space volume, described by a ray cone or ray pyramid, from front to back can likewise be performed, as a special function, by the traversal unit. FIG. 6 shows a two-dimensional drawing of a ray cone.

The signal conditioning for control of the display and the generation of the timing for the display or monitor may be effected in known manner by means of the optional rasterization hardware or implemented by suitable functional units if beneficial to the desired application. For example, the basic functions of standard rasterization hardware may be combined with the hardware-implemented ray tracing processes and functions to form a very powerful real-time hardware architecture.

A second exemplary embodiment of the invention is based on the configuration and use of freely programmable ray-tracing CPUs or ray-tracing processors, which are program-controlled to carry out the special ray-tracing functions and processes described in the invention. Thanks to appropriate logic parallelism and function parallelism, only a few—preferably one or two—CPU tact cycles are needed here to process the individual functions.

In so far as internal algorithms, processes and operational sequences of the ray-tracing processors are described, these are to be established using a hardware description language such as HDL, VHDL or JHDL and transferred to the hardware in question. The hardware implementation of the ray-tracing processors, with the implemented processes and functions, may be effected, by way of example, in a freely programmable FPGA logic device, in ASIC technology, in a combination of digital signal processors and FPGA/ASIC, or in a permanently wired custom chip.

This means that appropriate logic units and hardware-implemented arithmetic units must be configured, whose individual functions can be retrieved by way of program control. Depending on the complexity of the hardware technology employed, one or more ray-tracing processors can be realized per chip, with or without additional logic functions.

Ray-tracing processors are fully programmable computing units which are engineered to carry out vector arithmetic instructions and special ray-tracing instructions, such as "traversing" and "establishment of acceleration structures". The configuration may incorporate additional functional units or else make use of already available functional units plus a few additional logic devices if required. For example, traversing may be effected by means of special functional units or by expanding the available arithmetic functional units by a few logical functional units.

As shown in FIG. 11, several of the ray-tracing processors illustrated in FIG. 5 are connected in parallel. The memory interface is formed by a cache hierarchy that provides the necessary memory bandwidth. This procedure is efficient due to the strong coherence of adjacent rays. With the ray-tracing-processor system, each ray-tracing processor processes precisely one image pixel or one packet comprising several pixels. Here, the computation of each individual pixel corresponds to one computation thread. A plurality of these threads are bundled to form a packet and are processed synchronously as a whole. Synchronously processed threads are characterized in that they always jointly perform the same instruction. This makes it possible to create efficient hardware and to carry out memory requests per entire packet, not just individually for each thread. Particularly this reduction in the number of memory requests is a substantial advantage of processing packets of threads.

The thread generator of FIG. 11 creates threads which are processed on the ray-tracing processors. The thread generator can also be programmed by the ray-tracing processors. Special functions for scanning the image pixels in a cache-coherent manner (for example, Hilbert curve) make it possible to supply the ray-tracing processors optimally with coherent threads. This reduces the required memory bandwidth. Via a DMA interface, the thread generator also has access to the main memory. It is accordingly also possible to create the start values for the individual threads in a preliminary processing step and to write them into the memory, so that new threads can be generated from this information later on.

Pixels are processed by means of a software program that runs on the ray-tracing processor. This software program describes a recursive process sequence for computing the color value of a pixel, even if the hardware works on packets of rays. The packet management is accordingly transparent to the programming model.

FIG. 5 shows a typical structure for a ray-tracing processor. Visible is a standard processor core (RISC core) to which two special co-processors are connected in parallel. Each co-processor has its own register. However, by means of special instructions, it is also possible to transfer the contents of these registers from one co-processor into another. The traversal core is a special co-processor that is able to efficiently traverse the rays through an acceleration structure. To do this, it needs a special memory interface to the nodes of the acceleration structure (node cache). The vector arithmetic core is a special co-processor that is able to efficiently perform operations in 3D space. The vector additions, scalar multiplications, cross products and vector products needed by every ray-tracing software can be computed rapidly with this unit. The vector arithmetic unit requires access to a special cache which enables it to load whole vectors in a single tact.

The semantics of the traversal instruction could look as follows: the ray-tracing CPU writes into special registers the origin and direction of the ray and the address of the acceleration structure to be traversed. A specific instruction is now called, which starts a specific traversal unit. This unit traverses the acceleration structure and sends all nodes containing objects to a list unit; the latter may contain a mailboxing mechanism that has already been described in the first exemplary embodiment of the invention. For every object, the CPU now executes a small program that intersects the ray with this object. If a valid ray-object intersection is found, the program that shot the ray takes over again.

The individual instructions or logic functions that are hardware-implemented in the ray-tracing processor contain the same algorithms as have already been described for the permanently wired, first embodiment of the invention. In addition to these, however, this instruction set may be extended by supplementary, permanently wired instructions and functions, the activation of which is again program-controlled.

Thanks to special traversing operations, vector arithmetic and parallel processing of a plurality of threads on a ray-tracing processor, the necessary computational power for the real-time application is ensured while, at the same time, the effects of memory latencies (memory-request waiting times) on the system speed are minimized or even become irrelevant.

Once the pixel color has been fully computed, it can be written into the frame buffer. Additionally, the distance may be written into the z buffer. A connection with the rasterization hardware, and corresponding representation on a display, is thereby possible.

Claim 10 describes the use of a supplementary space-dividing data structure, which does not store or reference any geometric objects but contains spatial influences or material-modifying parameters. Spatial influences of this kind may include fog, haze, dust particles or hot smoke; hot smoke, for example, may also cause a modification to the scene visible through the smoke volume. Further spatial influences are light sources or material-modifying auras of the kind that may be used, for example, to represent imaginary entities. The use here of the space-dividing data structure permits a considerable reduction in the computational overhead, as only those influences need to be taken into account that are spatially located such that they are able to have an influence.

Claim 11 describes a further development that makes it possible to process three-dimensional scenes which are not, or not exclusively, made up of triangles, and that, where necessary, transforms other geometric primitives into triangles or into an easily-processed intermediate format. To obtain the additional functionality here, the hardware is either provided with additional functional units, or already available units implement the functionality.

Claim 12 describes a further development that makes it possible to compute, for each ray, not only the closest but, additionally, other ray-object intersections as the result of a ray-processing operation. It is beneficial here if the results are sorted according to the distance from the ray's origin. The maximum number of intersections per result may be defined as a constant or be described for each ray as a function of parameters of the intersected objects. This technique may be used to compute rays passing through transparent objects more efficiently.

Claim 13 describes a further development that is able to count, with additional and/or the available functional units, how often a specific element was used in computing an image. The elements to be counted here may differ greatly, and might possibly be classified via the address in the memory or via an element's ID. These elements include:

dynamic and geometric objects, partial or complete material descriptions, elements or subgroups of a space-description data structure, programs or program functions, individual memory cells and entire memory pages or memory areas.

Claim 14 describes an extension of the functionality for computing the space-description data structures for partial or complete three-dimensional scenes, where additional parameters for each dynamic object or dynamic sub-object or geometric object influence the manner in which the space-description data structure is computed. Influences of this kind may be, for example, that an object specifies that it possesses no geometric objects in given space volumes. This permits more efficient computation of the space-description data structure and, additionally, a further reduction in the per-image computational overhead.

DESCRIPTION OF THE DRAWINGS

203: Traversal unit
204: List unit, which contains a mailbox
205: Matrix-loading unit
206: Ray-casting unit
207: Transformation unit
208: Intersection-computation unit
209: Intersection unit
210: Node cache
211: List cache
212: Matrix cache

Figure 1:
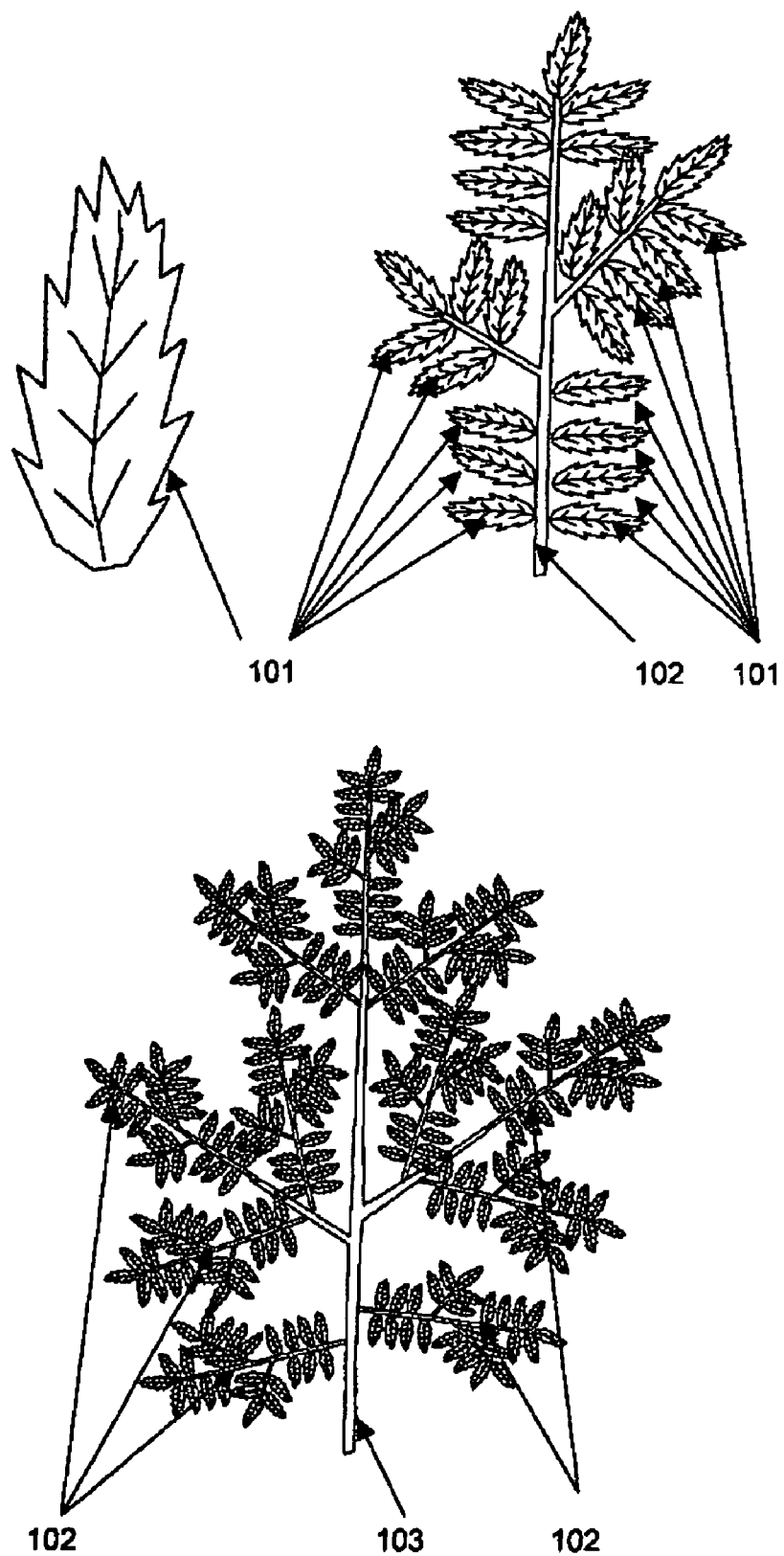
FIG. 1 illustrates how a tree can be built up from several object levels. To start with, a leaf is modeled as a level 1 object 101. This leaf 101 is now instantiated repeatedly and applied to a branch 102, thus creating another object, this time a level 2 object. These small branches 102 can now be instantiated repeatedly again to form a tree 103 as a level 3 object.

Below is a key to the reference numerals:
301: Rasterization hardware
302: Frame buffer
303: Video out
304: Tone-mapping unit
305: Z buffer
306: Frame buffer 1
307: Z buffer 1
308: Texture cache 1
309: Shading cache 1
310: Shading unit 1
311: Node cache 1
312: List cache 1
313: Matrix cache 1
314: RCP 1
315 Node cache 2
316: List cache 2
317: Matrix cache 2
318: RCP 2
319: Frame buffer 2
320: Z buffer 2
321: Texture cache 2
322: Shading cache 2
323: Shading unit 2
324: Node cache 3
325: List cache 3
326: Matrix cache 3
327: RCP 3
328 Node cache 4
329: List cache 4
330: Matrix cache 4
331: RCP 4

Figure 4:
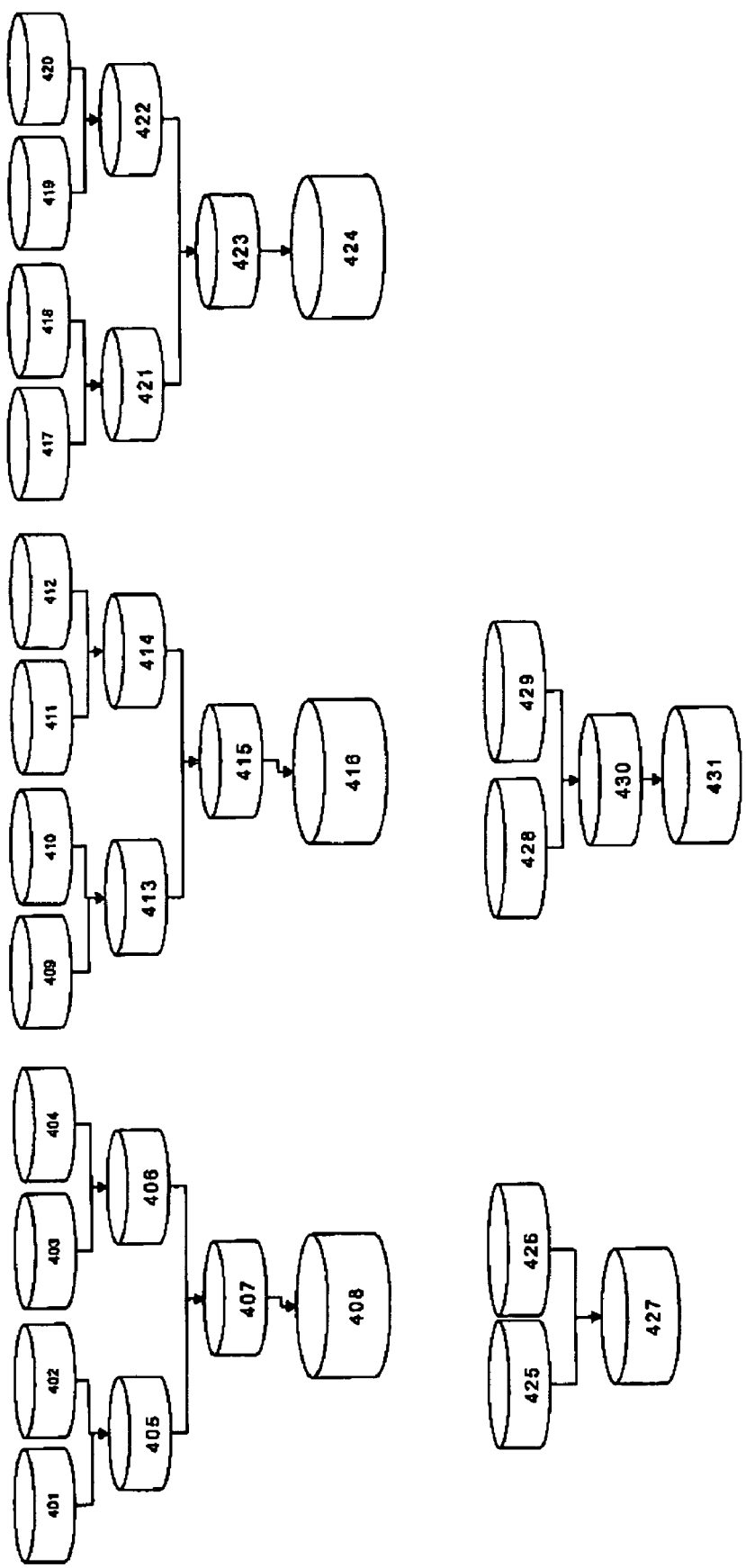

FIG. 4 illustrates the cache infrastructure that provides the necessary internal memory bandwidth in the chip. The infrastructure in the drawing is a binary n-level cache, but other hierarchical structures are also conceivable.

Figure 5:
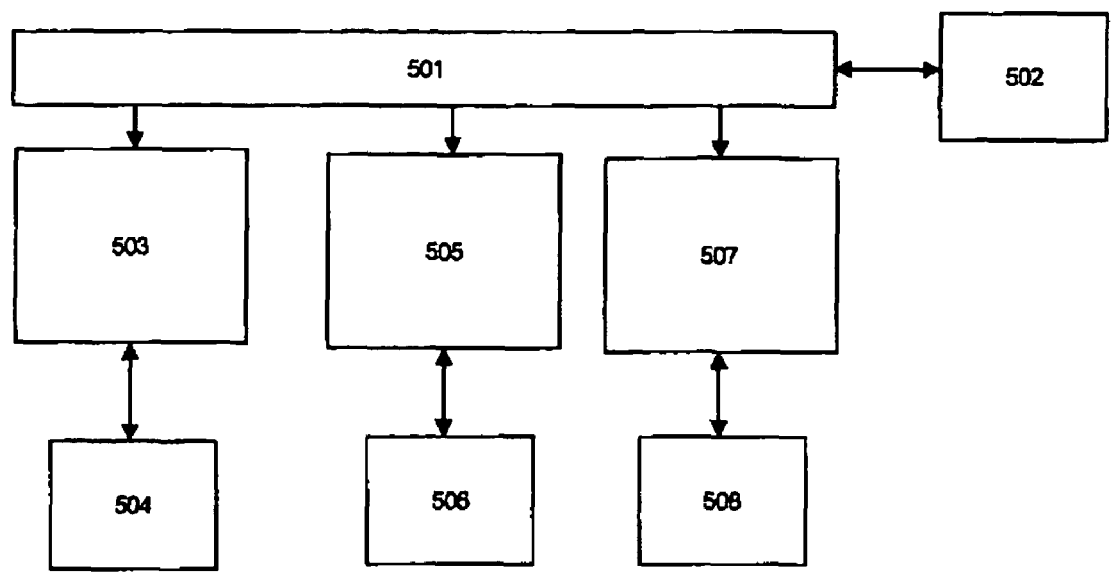
Figure 6:
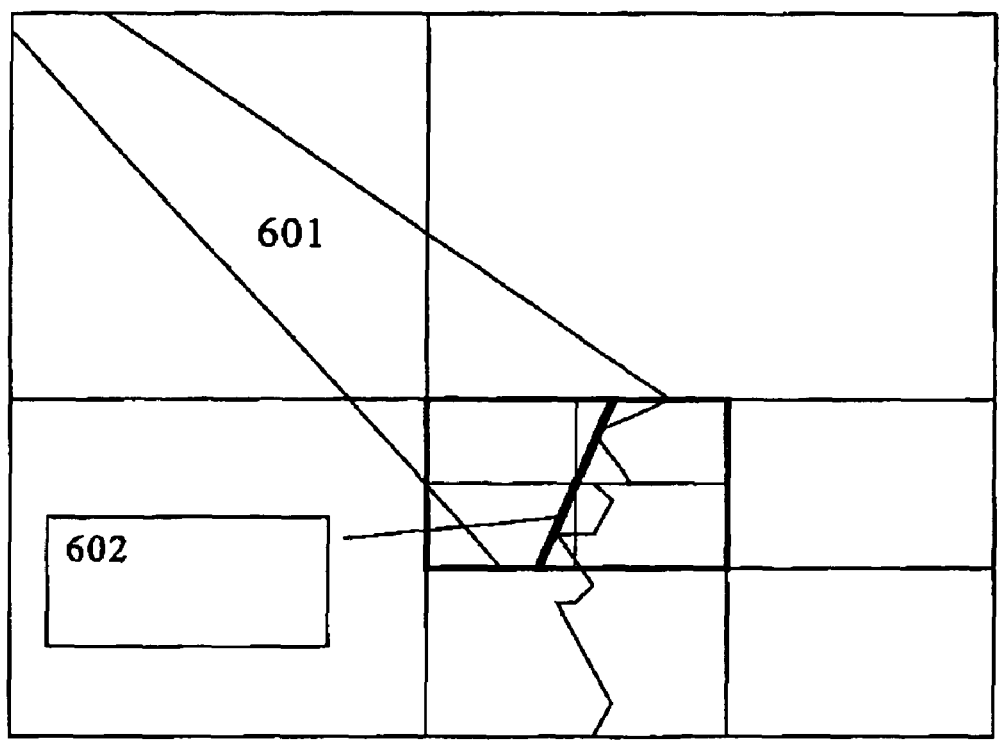

Below is a key to the reference numerals:
401: Node cache 1
402: Node cache 2
403: Node cache 3
404: Node cache 4
405: Node cache 5
406: Node cache 6
407: Node cache 7
408: Node memory
409: List cache 1
410: List cache 2
411: List cache 3
412: List cache 4
413: List cache 5
414: List cache 6
415: List cache 7
416: List memory
417: Matrix cache 1
418: Matrix cache 2
419: Matrix cache 3
420: Matrix cache 4
421: Matrix cache 5
422: Matrix cache 6
423: Matrix cache 7
424: Matrix memory
425: Texture cache 1
426: Texture cache 2
427: Texture memory
428: Shading cache 1
429: Shading cache 2
430: Shading cache 3
431: Shading memory FIG. 5 illustrates the exemplary embodiment of a ray-tracing CPU. Below is a key to the blocks:
501: Load instruction
502: Instruction memory
503: RISC core
504: Cache
505: Traversal core
506: Node cache
507: Vector arithmetic core
508: Vector cache FIG. 6 illustrates an example of simplified geometry in the octree nodes. The reference numeral 601 denotes the ray cone, and the reference numeral 602 an instance of "simplified geometry".

Figure 7:
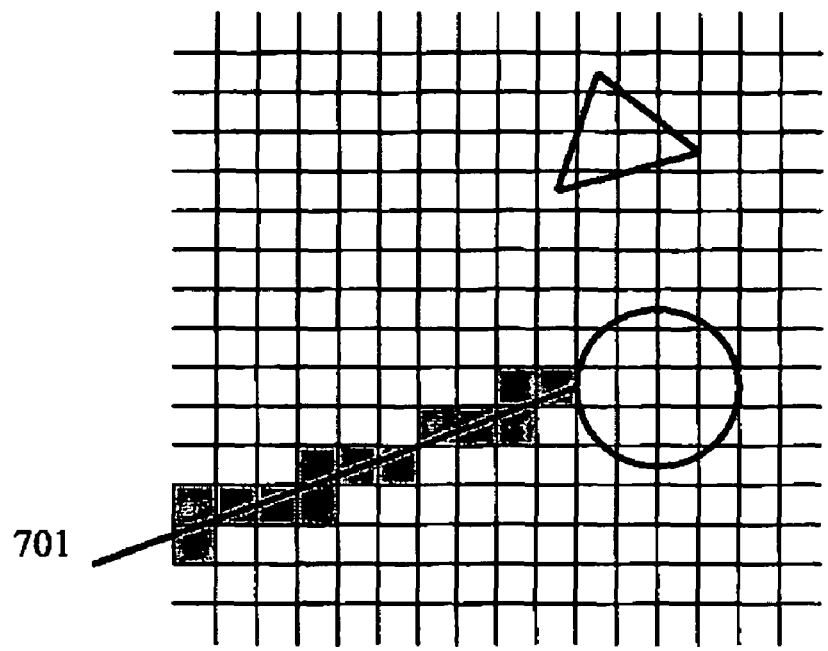

FIG. 7 illustrates an example of the uniform-grid acceleration structure at a simple scene. For the sake of simplicity, the space is only shown in 2D. The reference numeral 701 denotes the ray.

Figure 8:
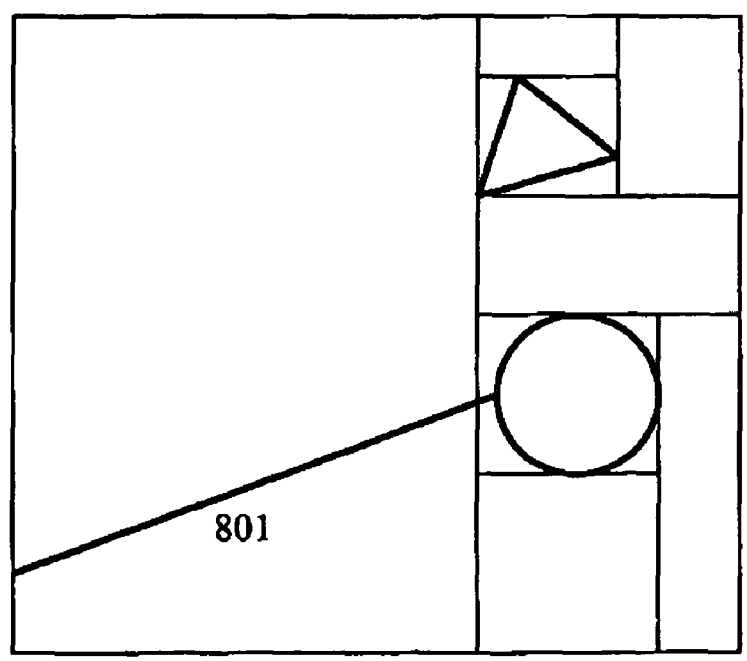

FIG. 8 illustrates an example of the kD-tree acceleration structure at a simple scene. For the sake of simplicity, the space is only shown in 2D. The reference numeral 801 denotes the ray.

Figure 9:
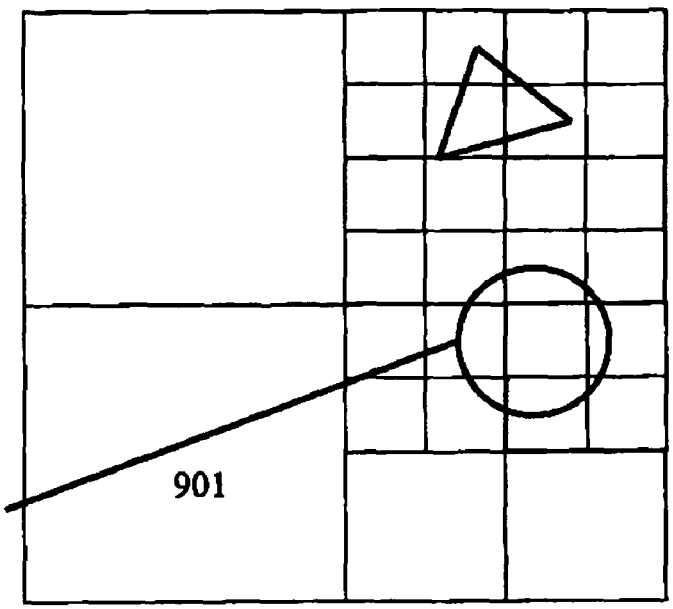

FIG. 9 illustrates an example of the octree acceleration structure at a simple scene. For the sake of simplicity, the space is only shown in 2D. The reference numeral 901 denotes the ray.

Figure 10:
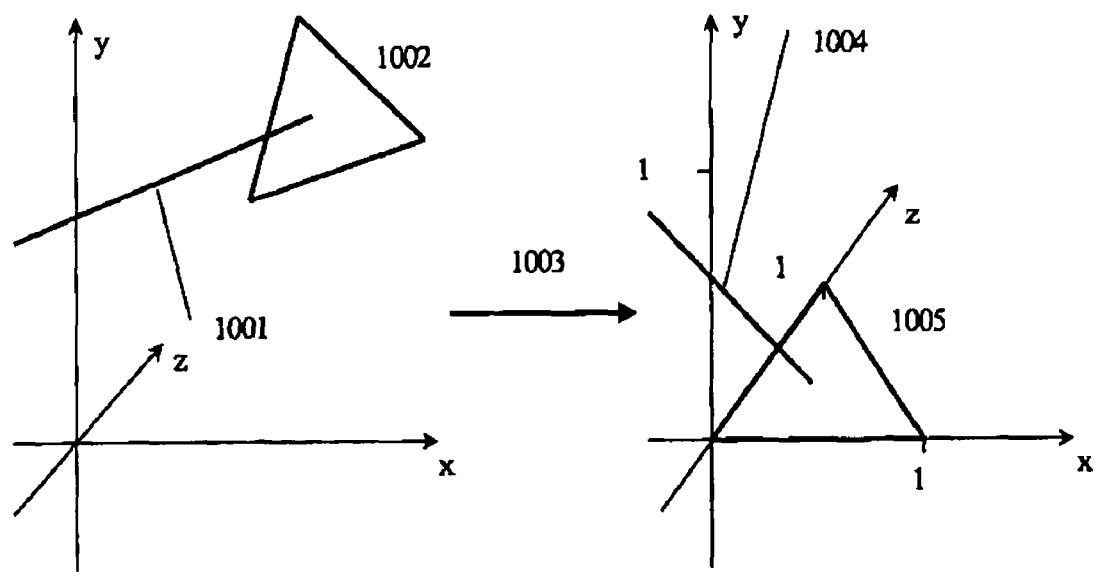

FIG. 10 illustrates the global to normalized object space transformation for a triangle. To be seen is a ray 1001 and a triangle 1002. A transformed ray 1004 and a normalized triangle 1005 are generated by an affine transformation represented by the arrow 1003. The global space is represented by the left coordinate system and the normalized triangle space by the right coordinate system.

Figure 2:
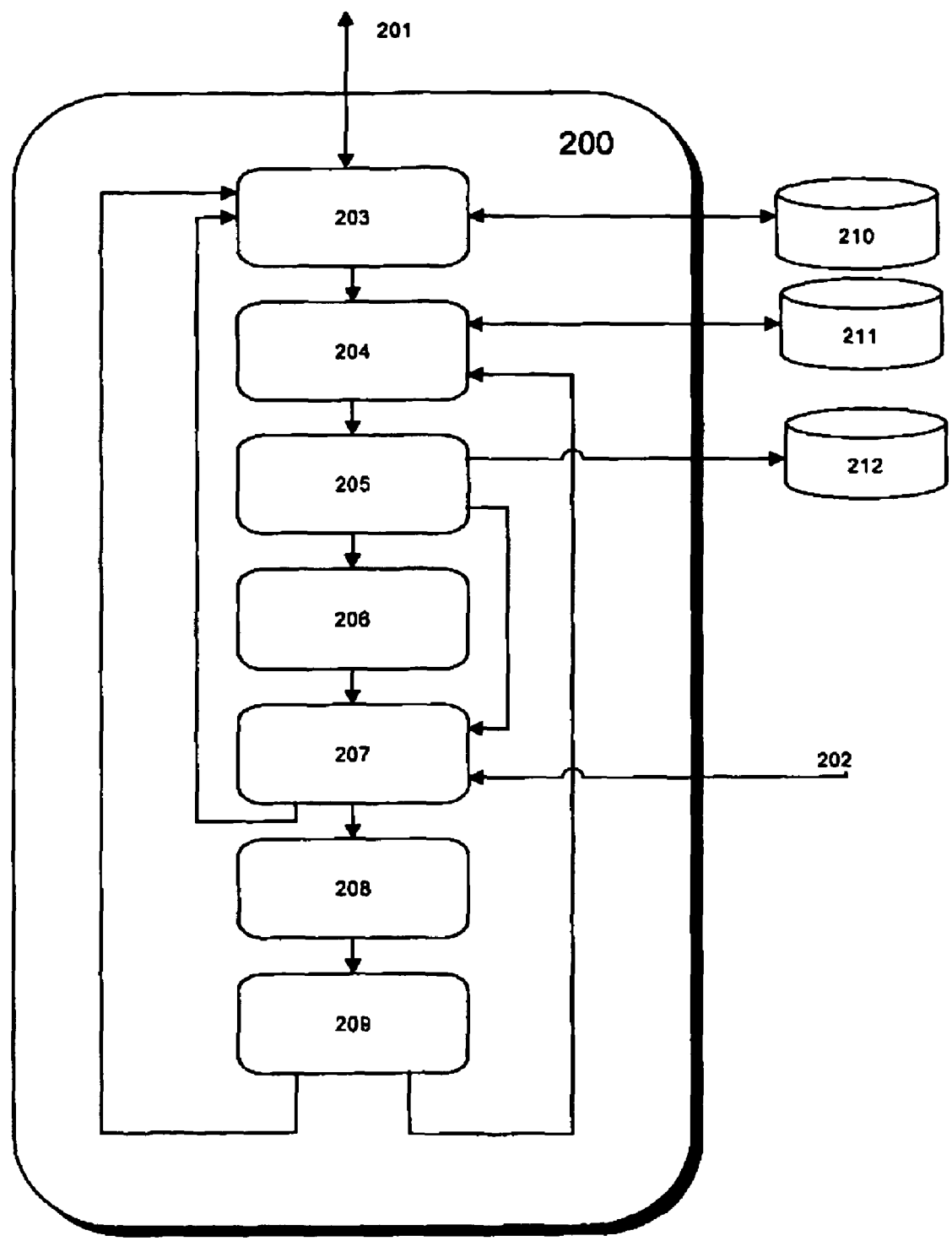
FIG. 2 illustrates the ray-casting pipeline 200, along with the most important data paths, and the interface to the caches. The arrow 201 goes to the shading unit, while the arrow 202 comes from the shading unit. Below is a key to the other reference numerals.
Figure 3:
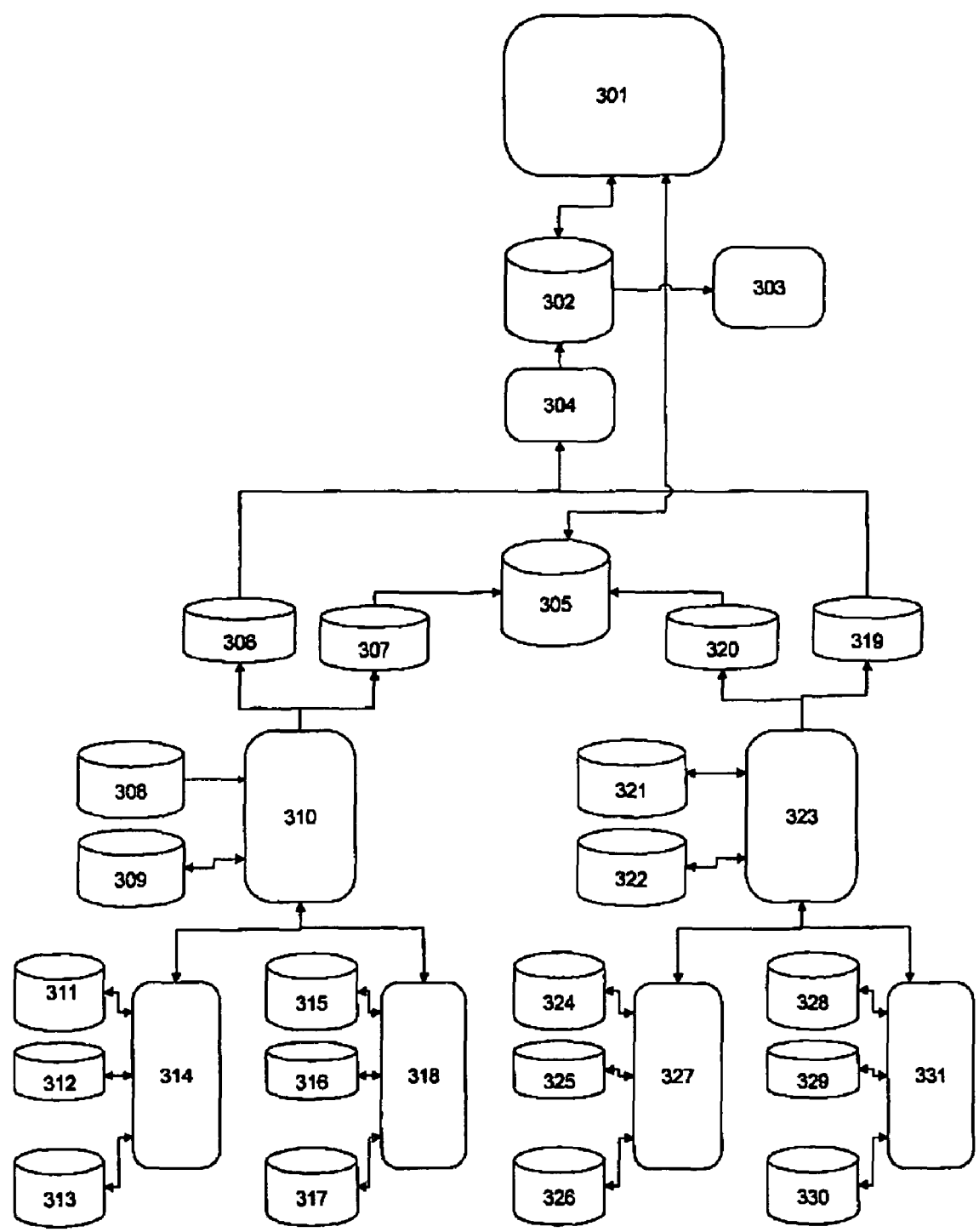
FIG. 3 illustrates the top-level diagram of an exemplary implementation of the invention. The 4 ray-casting pipelines (RCP) are connected with the separate memories for nodes, lists and matrices via a cache hierarchy. In this example, two of these RCPs, in each case, are connected with a shading unit that has access to a local frame buffer and z buffer. Via these, color values are written by means of a tone-mapping unit into a global frame buffer, and depth values are sent direct to a global z buffer. Prior-art rasterization hardware (rasterization pipeline) can be connected to the z buffer and the frame buffer.
Figure 11:
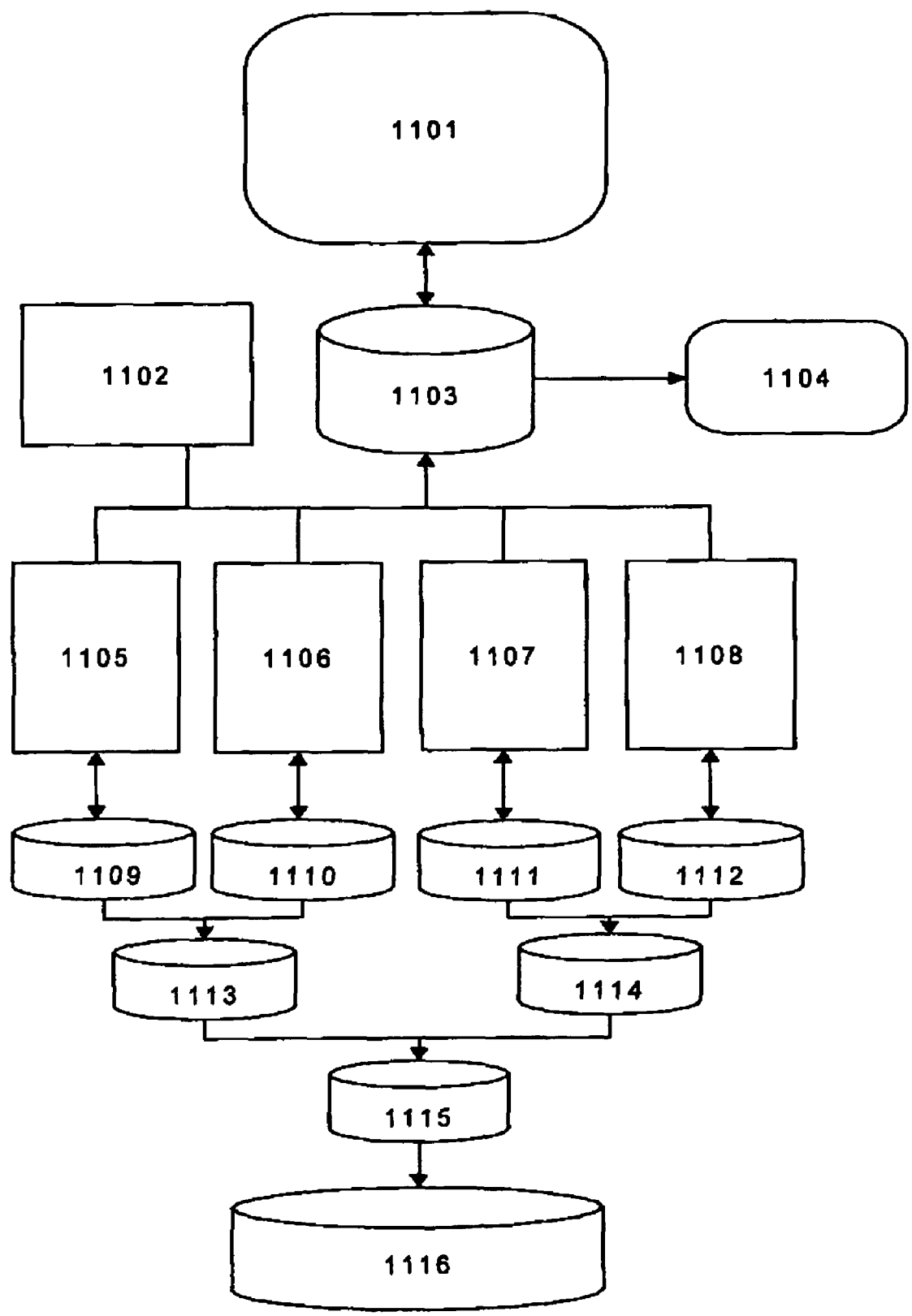
Figure 12:
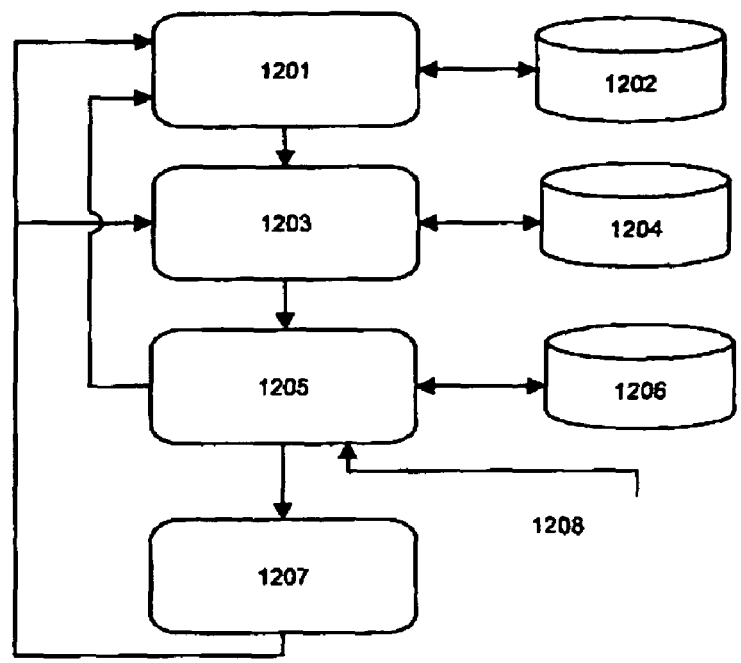

FIG. 11 illustrates an exemplary embodiment of the invention, which is based on special ray-tracing processors. Below is a key to the blocks:
1101: Rasterization hardware
1102: Thread generator
1103: Z buffer/frame buffer
1104: Video out
1105: Ray-tracing processor 1
1106: Ray-tracing processor 2
1107: Ray-tracing processor 3
1108: Ray-tracing processor 4
1109: Cache 1
1110: Cache 2
1111: Cache 3
1112: Cache 4
1113: Cache 5
1114: Cache 6
1115: Cache 7
1116: Main memory FIG. 12 illustrates a simplified version of the ray-casting pipeline shown in FIG. 2. Below is a key to the blocks:
1201: Traversal unit
1202: Node cache
1203: List unit
1204: List cache
1205: Transformation unit
1206: Matrix cache
1207: Intersection-computation unit The arrow 1208 comes from the shading unit.

Figure 13:
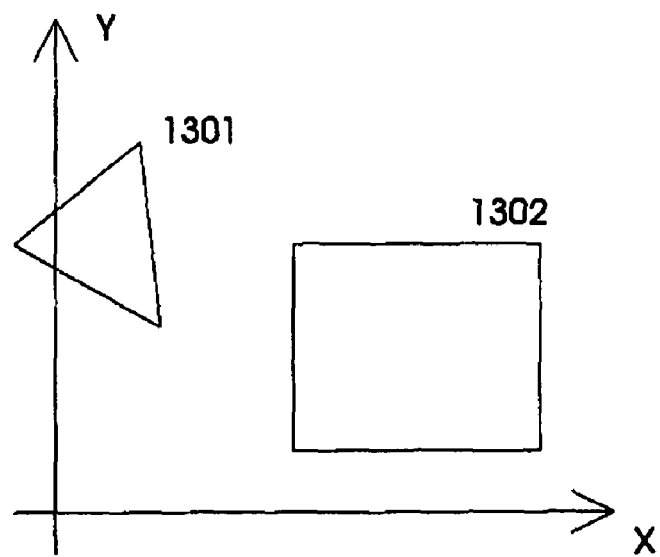

FIG. 13 illustrates a simple case in which evaluation and comparison of the vertices of a triangle and the vertices of a box permit a decision as whether the triangle and the box overlap. If the x coordinates of the triangle are smaller than the smallest x coordinate of the box, the triangle is located outside the box. The triangle is denoted by the reference numeral 1301, the box by the reference numeral 1302.

What is claimed is:

1. A method for rendering three-dimensional scenes, the method comprising:
   rendering the three dimensional scenes, by a computing device, via ray-tracing;
   establishing, by the computing device, a ray-tracing acceleration structure having a plurality of objects;
   traversing, by the computing device, a ray through the acceleration structure until an object of intersection with the ray is identified;
   performing a first intersection computation between the object of intersection and the ray;
   storing, by the computing device, the object of intersection in a list of objects that have been intersected by the ray; and
   after the object of intersection is stored in the list:
      searching the list, by the computer device, for the object of intersection; and
      preventing, by the computing device, further performing of intersection computations between the object of intersection and the ray after performing the first intersection computation.

2. The method of claim 1 further comprising:
   determining, by the computing device, whether an affirmative decision is possible as to whether a triangle within the ray-tracing acceleration structure overlaps a node of the acceleration structure, the decision being based at least in part on comparisons of the vertices of the triangle with the vertices of the node; and
   when the affirmative decision is not possible, deciding, by the computing device, by making a conservative decision as to whether the triangle overlaps the node.

3. The method of claim 1 further comprising:
   computing, by the computing device, a three dimensional ray space occupied by the ray according to the ray's increasing distance from a virtual source;
   traversing, by the computing device, the ray space; and
   processing, by the computing device, selected objects identified within the ray space.

4. The method of claim 3, wherein the ray space is a selected one of a cone or a pyramid, and the method further comprises processing, by the computing device, objects within the ray space, and ordering the objects according to the objects' virtual distances from the virtual source of the ray.

5. The method of claim 3, wherein the ray-tracing acceleration structure further comprises at least one acceleration structure node, with each node being associated with a region of node space, and the method further comprises:
   storing, by the computing device, simplified geometry data associated with respective acceleration structure nodes, the respective simplified geometry data omitting one or more triangles from geometry data for the node; and
   computing, by the computing device, a ray-object intersection, using the simplified geometry data to compute the ray-object intersection when the ray space overlaps a majority of the node space.

6. The method of claim 1 further comprising:
   subdividing, by the computing device, the plurality of objects into an n-level hierarchy of objects and sub-objects;
   classifying, by the computing device, the objects as primitive or non-primitive;
   traversing the ray through the acceleration structure until an intersected object is identified; and
   after traversing the ray,
      if the identified object is not a primitive object, storing, by the computing device, affine transformation data which transforms the object and ray into a coordinate system locally associated with the identified object, and traversing the local coordinate system and storing affine transformation data, recursively, until the ray intersects with a primitive object; and
      if the identified object is a primitive object, storing, by the computing device, transformation data which transforms the primitive object and ray into a normalized object space locally associated with the identified object, intersecting the transformed ray with the transformed identified object, and storing, by the computing device, ray-object intersection data.

7. The method of claim 1 further comprising:
   subdividing, by the computing device, the plurality of objects into an n-level hierarchy of objects and sub-objects;
   recursively instantiating, by the computing device, a plurality of sub-objects, the sub-objects having a similar geometry; and
   building, by the computing device, a next level object by, at least in part, using the plurality of instantiated sub-objects with similar geometry.

8. An apparatus for rendering three-dimensional scenes, the apparatus comprising:
   a processor;
   a tangible computer-accessible storage medium operatively coupled to the processor;

a ray-tracing acceleration structure stored in the storage medium, the acceleration structure having object data for a plurality of objects; and a ray-casting module operatively configured to traverse rays through the acceleration structure and return ray-object intersection data, the ray-casting module comprising a decision unit operatively configured such that, when ray-object intersection data has been computed for a given ray and a given object, the decision unit records that the given ray has intersected the given object and prevents additional ray-object intersection computations from being carried out for the given ray and the given object.

9. The apparatus of claim 8 wherein the ray-casting module further comprises an acceleration structure computation unit operatively configured to:

determine if an affirmative decision is possible as to whether a triangle within the ray-tracing acceleration structure overlaps a node of the acceleration structure, the decision being based at least in part on comparisons of the vertices of the triangle with the vertices of the node; and if the affirmative decision is possible, store the affirmative decision as part of establishing the acceleration structure.

10. The apparatus of claim 9 wherein, the acceleration structure computation unit is further configured to compute, if the affirmative decision is not possible, a conservative decision as to whether the triangle overlaps the node and store the conservative decision as part of establishing the acceleration structure.

11. The apparatus of claim 8 wherein the ray-casting module further comprises a traversal unit, the traversal unit operatively configured to:

compute a three dimensional ray space occupied by the ray according to the ray's increasing distance from a virtual source; and traverse the ray space through the acceleration structure from the virtual source of the ray through an increasing virtual distance from the virtual source of the ray.

12. The apparatus of claim 11 wherein the ray space traversed is a selected one of a cone or a pyramid.

13. The apparatus of claim 11 wherein the acceleration structure further comprises at least one acceleration structure node, each node being associated with a region of node space; and wherein the ray casting module is further configured to store simplified geometry data associated with each acceleration structure node which omits one or more triangles from geometry data for the node; and, when the ray space overlaps a majority of the node space, compute ray-object intersection using the simplified geometry data.

14. The apparatus of claim 8 wherein the ray-casting module further comprises:

a matrix unit;
a transformation unit; and
a ray casting unit,
wherein the matrix unit is operatively configured to send affine transformation matrices of object data to the transformation unit, each affine transformation matrix being a selected one of an object-space transformation matrix and a normalized space transformation matrix, and the transformation unit is further operatively configure to receive the ray from the ray casting unit and transform the ray into the object's affine transformation matrix's coordinate system.

15. The apparatus of claim 14 wherein the ray-casting module further comprises:

an acceleration structure computation unit operatively configured to subdivide the plurality of objects into an n-level hierarchy of objects and sub-objects and store data classifying the objects as primitive or non-primitive;

a traversal unit operatively configured to traverse the ray through the acceleration structure until a potential ray-object intersection is identified; and an intersection computation unit;

wherein, the transformation unit is operatively configured to send the object's affine transformation matrix data and the transformed ray data to the transversal unit for recursive processing until the ray intersects with a primitive object, if the object identified by the traversal unit is not a primitive object; and wherein, the transformation unit is operatively configured to send the object's affine transformation matrix data and the transformed ray data to the intersection computation unit, if the object identified by the traversal unit is a primitive object.

16. An article of manufacture comprising a non-transitory computer-accessible storage medium for digitally storing a plurality of programming instructions designed to program an apparatus to render three-dimensional scenes, wherein the programming instructions, if executed by the apparatus, enable the apparatus to:

establish ray tracing acceleration structures having a plurality of objects; and for a given ray, and for an object for which an intersection computation has been performed with the given ray:
record that the intersection computation has been performed for the given ray and the object; and
prevent further performing of intersection computations between the object and the given ray.

17. The article of manufacture of claim 16 wherein the programming instructions, if executed, further enable the apparatus to:

determine if an affirmative decision is possible as to whether a triangle within the ray-tracing acceleration structure overlaps a node of the acceleration structure, the decision being based at least in part on comparisons of the vertices of the triangle with the vertices of the node; and if the affirmative decision is not possible, decide by making a conservative decision as to whether the triangle overlaps the node.

18. The article of manufacture of claim 16 wherein the programming instructions, if executed, further enable the apparatus to:

compute a three dimensional ray space occupied by the given ray according to the ray's increasing distance from a virtual source;

traverse the ray space through the acceleration structure; and process selected objects identified within the ray space.

19. The article of manufacture of claim 18 wherein the ray space traversed by the ray is a selected one of a cone or a pyramid, and the programming instructions, if executed, further enable the apparatus to process the selected objects within the ray space, and order the selected objects according to the selected objects' virtual distances from the virtual source of the ray.

20. The article of manufacture of claim 18 wherein the acceleration structures have at least one acceleration structure node, each node being associated with a region of node space; and wherein the programming instructions, if executed, further enable the apparatus to:

store simplified geometry data associated with each acceleration structure node which omits one or more triangles from geometry data for the node; and when the ray space overlaps a majority of the node space, compute ray-object intersection, using the simplified geometry data.

21. The article of manufacture of claim 16 wherein the programming instructions, if executed, further enable the apparatus to:

subdivide the plurality of objects into an n-level hierarchy of objects and sub-objects;

classify the objects as primitive or non-primitive;

traverse the given ray through the acceleration structure until an intersected object is identified;

if the identified object is not a primitive object, store affine transformation data which transforms the identified object and ray into a coordinate system locally associated with the identified object, and traverse the transformed ray through the local coordinate system and store affine transformation data, recursively, until the ray intersects with a primitive object; and if the identified object is a primitive object, store transformation data which transforms the primitive object and ray into a normalized object space locally associated with the identified object, intersect the transformed ray with the transformed identified object, and store ray-object intersection data.

22. The article of manufacture of claim 16 wherein the programming instructions, if executed, further enable the apparatus to:

subdivide the plurality of objects into an n-level hierarchy of objects and sub-objects;

recursively instantiate a plurality of sub-objects, the sub-objects having a similar geometry; and build a next level object by, at least in part, using the plurality of instantiated sub-objects with similar geometry.

23. A processor for rendering three-dimensional scenes, the processor comprising:

a traversal unit, the traversal unit being coupled to a plurality of node caches for storing acceleration structure node data, the node data structured to improve accessibility according to ray coherence, the node caches arranged in an n-level hierarchy;

a list unit, the list unit being coupled to a plurality of list caches for storing lists of object addresses for objects that have already been intersected by a ray, the list caches arranged in an n-level hierarchy, the list unit having a decision unit, the decision unit configured to prevent objects whose object addresses are stored in the list from being intersected again by the ray; and a matrix loading unit, the matrix loading unit being coupled to a plurality of matrix caches for storing affine transformations in the form of matrices, the matrix caches arranged in an n-level hierarchy.

* * * * *

UNITED STATES PATENT AND TRADEMARK OFFICE
CERTIFICATE OF CORRECTION

| | | |
|---|---|---|
| PATENT NO. | : 8,115,763 B2 | Page 1 of 1 |
| APPLICATION NO. | : 10/589794 | |
| DATED | : February 14, 2012 | |
| INVENTOR(S) | : Woop et al. | |

It is certified that error appears in the above-identified patent and that said Letters Patent is hereby corrected as shown below:

On Title Page 2, item (56), under "Other Publications", in Column 2, Line 67, delete "Volumbe 6," and insert -- Volume 6, --.

Column 1, line 13, delete "article 21 (2)" and insert -- article 21(2) --.

Column 17, line 42, in Claim 1, delete "three dimensional scenes," and insert -- three-dimensional scenes, --.

Column 19, line 64, in Claim 14, delete "transformation unit is further operatively configure to" and insert -- transformation unit is further operatively configured to --.

Signed and Sealed this
Nineteenth Day of March, 2013

Teresa Stanek Rea
*Acting Director of the United States Patent and Trademark Office*